Figure 1:
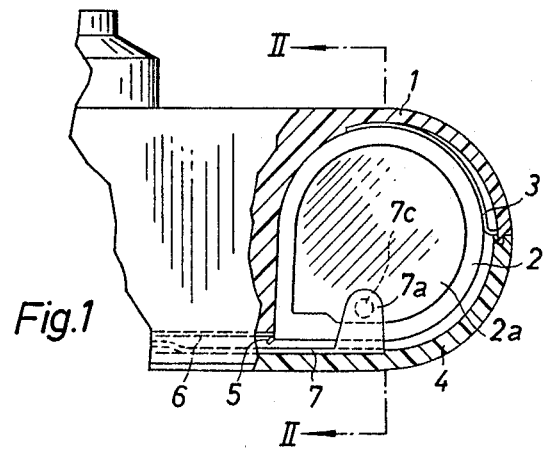

Sept. 6, 1966  D. ENGELSMANN ET AL  3,270,645
CAMERA STRUCTURE FOR HANDLING FILM CARTRIDGES
Filed Oct. 21, 1964

INVENTOR.
DIETER ENGELSMANN
SIEGFRIED ZOBEL
BY
Michael S. Striker

United States Patent Office 3,270,645
Patented Sept. 6, 1966

3,270,645
CAMERA STRUCTURE FOR HANDLING
FILM CARTRIDGES
Dieter Engelsmann and Siegfried Zobel, Munich, Germany, assignors to Agfa Aktiengesellschaft, Leverkusen, Germany
Filed Oct. 21, 1964, Ser. No. 405,543
Claims priority, application Germany, Oct. 31, 1963,
A 44,440
8 Claims. (Cl. 95—31)

The present invention relates to cameras.

More particularly, the present invention relates to cameras which have camera housings provided with cartridge chambers for receiving film cartridges between which the film is advanced during exposure thereof.

In cameras of this latter type, particularly where the film cartridges simply house a coil of film which is not supported on a rotary spool, the film cartridge is held by one or more suitable springs in the cartridge chamber. In most cameras there will be a pair of cartridge chambers for respectively receiving supply and take-up cartridges both of which are held by suitable spring assemblies in the cartridge chambers, and usually these cartridges are held by the spring assemblies in a proper position for directing the film from the supply to the take-up cartridge until the rear wall of the camera is displaced to its position closing the camera. After the film has been exposed so that it has been displaced out of the supply cartridge to the take-up cartridge it is necessary to remove the cartridges from the chambers, and in order to accomplish this result very often the operator will encounter difficulties in removing both the full take-up cartridge and the empty supply cartridge because of the fact that these cartridges are held by the above-mentioned spring assemblies against movement out of the chambers.

It is accordingly a primary object of the present invention to provide a camera with a structure which will make it very easy for the cartridges to be removed from the camera housings.

A further object of the present invention is to provide a camera with a structure which will make removal of the cartridge from the camera housing so easy that absolutely no particular manual dexterity is required for this purpose.

In particular, it is an object of the present invention to provide a structure which will at least initiate the movement of the cartridges out of the camera housing when the latter is opened.

With the above objects in view the invention includes, in a camera, a camera housing having a cartridge chamber in its interior for receiving a film cartridge. The camera housing includes a wall movable into engagement with the remainder of the camera housing for closing the cartridge chamber and displaceable away from the remainder of the camera housing for giving access to the cartridge chamber, and in accordance with the present invention this wall carries a means which will displace a cartridge out of the cartridge chamber when the wall is displaced away from the remainder of the camera housing.

Figure 2:
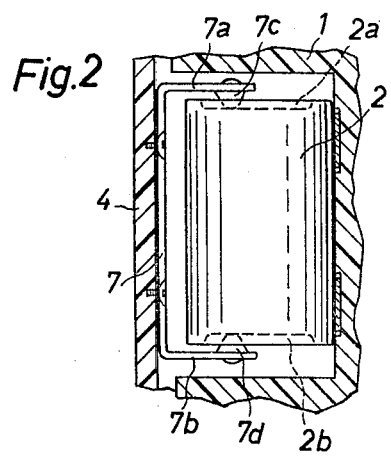

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary partly sectional illustration of one possible structure according to the present invention, FIG. 1 showing part of the camera in a top plan view and the section of FIG. 1 being taken in a horizontal plane substantially parallel to the top wall of the camera; and FIG. 2 is a fragmentary sectional elevation taken along line II—II of FIG. 1 in the direction of the arrows.

Referring now to the drawings, there is illustrated therein a camera housing 1 which is formed in its interior with a cartridge chamber which is adapted to receive the film cartridge 2 which is maintained in the cartridge chamber by the leaf springs 3 in a manner well known in the art, and the camera housing includes a rear wall 4 displaceable into engagement with the remainder of the camera housing 1 for closing the camera housing, and in particular the cartridge chamber thereof, the rear wall 4 being displaceable away from the remainder of the camera housing 1 to open the camera housing and give access to the cartridge chamber. The springs 3 serve to maintain the cartridge 2 with the film outlet 5 thereof properly oriented so as to direct the film strip 6 through the focal plane. The cartridge 2 is of the type which receives a coil of film which is not mounted on a rotary spool, so that the cartridge 2 is quite simple in that it does not include a rotary spool or a structure for mounting the rotary spool. During exposure of the film, the film is advanced from the supply cartridge into the interior of an identical cartridge 2 situated at the other side of the camera and acting as a take-up cartridge for receiving the exposed film. After the film has been exposed, it will, of course, be necessary to remove both of the cartridges 2 which are arranged substantially symmetrically, and with the structure illustrated in the drawing and described above, a certain amount of manual dexterity will be required to enable the operator to engage the cartridges 2 and displace them out of the cartridge chambers of the camera housing because the springs 3 resiliently maintain these cartridges in the cartridge chamber and the cartridges do not have readily available surface areas which are of easy access to the fingers of the operator for removal of the cartridges from the camera housing.

In order, in accordance with the present invention, to facilitate removal of the cartridges under these circumstances the wall 4 of the camera housing carries a means 7 which engages and displaces the cartridge 2 out of the camera housing when the wall 4 is displaced away from the remainder of the camera housing 1, and in the preferred example this means takes the form of the spring means 7. The spring means 7 clamps the ends of the cartridges 2 in a resilient and releasable manner so as to withdraw the cartridges 2 from the interior of the camera housing when the wall 4 is displaced away from the remainder of the camera housing. For this purpose the spring means 7 is in the form of an elongated leaf spring of a substantially U-shaped configuration having upper and lower clamping legs 7a and 7b, respectively. The intermediate substantially vertically extending portion of the spring 7 is fixed in any suitable way to the interior surface of the rear wall 4 of the camera housing 1.

When the wall 4 is displaced into engagement with the remainder of the camera housing 1 so as to close the latter, projections 7c and 7d which are respectively carried by the springy legs 7a and 7b pass into end depressions 2a and 2b, respectively, formed in the end walls of the cartridge 2, the legs 7a and 7b being deflected by engagement of the outer peripheral portions of the end walls of the cartridge 2 with the projections 7c and 7d until the latter snap into the recesses 2a and 2b. Thus, after exposure of the film strip 6 has been completed, the wall 4 will be displaced way from the remainder of the camera housing, and the spring means 7 will pull the cartridge 2 out of the camera housing. This cartridge 2 is now supported solely by the spring means 7 and is freely accessible at the inner surface of the rear camera wall, so that the operator can very easily remove the cartridge from the spring means 7 without exercising any particular manual dexterity.

Of course, only one spring 7 can be provided for removing one cartridge, although a symmetrically arranged additional spring 7 can be provided for removing the second cartridge also from the camera housing. As is apparent from FIG. 1, the wall of the spring means 7 from which the legs 7a and 7b project extends through a considerable distance along the inner surface of the rear wall 4, and this spring means 7 is therefore capable of being formed integrally with the pressure plating spring of the camera, although the simple U-shaped leaf spring as shown in FIG. 2 will suffice.

Of course, the invention is not limited to the above details. For example, it is possible to provide a clamping spring assembly similar to the spring means 7 on a removable bottom wall of a camera housing, in which case the spring would extend around an outwardly directed flange or bead at the outer periphery of the lower end wall of the cartridge. With such an arrangement the cartridge would be removed downwardly from the interior of the camera housing when the bottom wall is displaced downwardly away from the remainder of the camera housing. This latter arrangement can also be used to facilitate removal of cartridges which are provided with film spools. Also, the use of levers rather than springs for displacing the cartridges outwardly of the camera housing can be provided in accordance with the present invention.

Thus, it will be seen that with the present invention when the camera is closed the spring means of the invention clampingly engages the film cartridge to displace the latter out of the camera housing when the camera is subsequently opened.

It will be understood that each of the elements described above, or two or more together, may also find a useful application in other types of cameras differing from the types described above.

While the invention has been illustrated and described as embodied in cameras and film cartridges, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a film cartridge, a camera housing formed in its interior with a cartridge chamber for receiving said film cartridge, said housing including a wall movable in a predetermined direction into engagement with the remainder of said housing for closing said chamber thereof and displaceable in opposite direction away from the remainder of said housing for giving access to said cartridge chamber, and a pair of means respectively carried by said wall and said film cartridge, one of said means including a springy engaging member movable into engagement with the other of said means in a direction transverse to said predetermined direction for releasably connecting said film cartridge to said wall when said wall is moved into engagement with the remainder of said housing, said pair of means maintaining said releasable connection while said wall is displaced away from the remainder of said camera housing in said opposite direction so that said film cartridge is displaced out of said chamber when said wall is displaced in said opposite direction.

2. In a camera, in combination, a camera housing having a cartridge chamber in its interior for receiving a film cartridge, said housing having a wall movable in a predetermined direction into engagement with the remainder of said housing for closing said chamber and displaceable away from the remainder of said housing for giving access to said chamber; and spring means carried by said wall and including an engaging portion movable in a direction transverse to said predetermined direction for resiliently and releasably clamping a cartridge in said chamber when said wall is moved into engagement with the remainder of said housing and for continuing to releasably clamp said cartridge while said wall is displaced away from the remainder of said housing whereby said cartridge is displaced out of said chamber when said wall is displaced away from the remainder of said housing.

3. In a camera as recited in claim 2, said cartridge being formed with exterior recesses and said spring means extending into said recesses when said wall is displaced into engagement with said remainder of said housing for closing said chamber.

4. In a camera as recited in claim 3, said wall being a rear wall of the camera housing and said cartridge having end recesses into which said spring means extends.

5. In a camera as recited in claim 4, said spring means being of a substantially U-shaped configuration having a pair of legs respectively terminating in free ends which respectively carry projections respectively extending into said cartridge recesses and said spring means having between said legs an elongated portion fixed to said rear camera wall at an inner face thereof which is directed toward the interior of the camera housing when said rear wall is in said position engaging said remainder of said camera housing for closing the latter.

6. In a camera as recited in claim 3, a pressure plate spring for maintaining film at the focal plane of the camera, said spring means being integral with said pressure plate spring.

7. In a camera as recited in claim 2, said wall being a bottom wall of the camera housing displaceable downwardly from the remainder thereof for giving access to the interior of said camera housing and displaceable back up to the remainder of said camera housing for closing the latter, said spring means being carried by said bottom wall.

8. In a camera, in combination, a camera housing having a cartridge chamber in its interior for receiving a film cartridge formed with exterior end recesses, said housing having a rear wall movable into engagement with the remainder of said housing for closing said chamber and displacement away from the remainder of said housing for giving access to said chamber; and spring means carried by said rear wall for resiliently and releasably clamping the cartridge in said chamber when said rear wall is displaced into engagement with said remainder of said housing for closing said chamber so that said cartridge will be removed from the chamber when said wall is displaced away from the remainder of said housing, said spring means being of a substantially U-shaped configuration having a pair of legs respectively terminating in free ends which respectively carry projections respectively extending into said cartridge recesses and said spring means having between said legs an elongated portion fixed to said rear wall at an inner face thereof which is directed toward the interior of the camera housing when said rear wall is in said position engaging said remainder of said camera housing for closing the latter, said spring means including a pressure plate spring portion integral with said elongated portion thereof for maintaining film at the focal plane of the camera.

References Cited by the Examiner

UNITED STATES PATENTS

| | | | |
|---|---|---|---|
| 1,402,167 | 1/1922 | Kingsbury | 242—71 |
| 2,381,033 | 8/1945 | Bolsey | 352—78 |
| 2,924,158 | 2/1960 | Kopp et al. | 352—77 |
| 2,938,443 | 5/1960 | Gunther et al. | 95—34 |

NORTON ANSHER, *Primary Examiner.*

V. A. SMITH, *Assistant Examiner.*